United States Patent [19]

Miller

[11] Patent Number: 4,853,431

[45] Date of Patent: Aug. 1, 1989

[54] METHOD FOR STABILIZING AQUEOUS SOLUTIONS OF CATIONIC THERMOSETTING POLYAMIDE-EPICHLOROHYDRIN RESINS

[75] Inventor: John F. Miller, Tacoma, Wash.

[73] Assignee: Georgia-Pacific Resins, Inc., Atlanta, Ga.

[21] Appl. No.: 129,670

[22] Filed: Dec. 7, 1987

[51] Int. Cl.$^4$ .................... C08L 77/06; D21H 3/58
[52] U.S. Cl. .................. 524/608; 162/164.6
[58] Field of Search .......................... 524/608

[56] References Cited

U.S. PATENT DOCUMENTS

| | | |
|---|---|---|
| 2,173,243 | 9/1939 | Young . |
| 2,540,855 | 2/1950 | Tullock . |
| 2,711,398 | 6/1955 | Barnes et al. . |
| 2,926,154 | 2/1960 | Keim . |
| 3,070,562 | 12/1962 | Koller . |
| 3,197,427 | 7/1965 | Schmalz . |
| 3,224,990 | 12/1965 | Babcock . |
| 3,240,761 | 3/1966 | Keim et al. . |
| 3,259,600 | 7/1966 | Coscia et al. . |
| 3,288,738 | 11/1966 | Rosenthal et al. . |
| 3,332,901 | 7/1967 | Keim . |
| 3,352,833 | 11/1967 | Earle . |
| 3,584,072 | 6/1971 | Winslow . |
| 3,778,339 | 12/1973 | Williams et al. . |
| 4,263,187 | 4/1981 | Chute . |
| 4,340,440 | 7/1982 | Chute . |
| 4,481,116 | 11/1984 | Cabestany et al. . |
| 4,714,736 | 12/1987 | Juhl .................... 524/608 |

*Primary Examiner*—C. Warren Ivy
*Attorney, Agent, or Firm*—Banner, Birch, McKie & Beckett

[57] ABSTRACT

A process for stabilizing an aqueous solution of a thermosetting polyamide-epichlorohydrin resin useful for imparting wet strength to paper by adding a mixture of a weak acid and a strong acid to said aqueous solution.

16 Claims, No Drawings

METHOD FOR STABILIZING AQUEOUS SOLUTIONS OF CATIONIC THERMOSETTING POLYAMIDE-EPICHLOROHYDRIN RESINS

BACKGROUND OF THE INVENTION

1. Field of the Invention

This invention is directed to a method for improving the stability of aqueous solutions of cationic thermosetting polyamide-epichlorohydrin resins. The present invention is directed specifically to a method for improving the stability of an aqueous solution of a cationic thermosetting polyamide-epichlorohydrin resin by acidifying the resin with an aqueous mixture of a weak acid and a strong acid.

2. Description of Related Art

Cationic thermosetting resins prepared by reacting a polyamide of a polyalkylene polyamine such as diethylenetriamine, and a dicarboxylic acid such as adipic acid, with epichlorohydrin are known to be efficient wet-strength resins for paper. For example, see Keim U.S. Pat. No. 2,926,154. Such resins can be used under alkaline, neutral or acidic conditions.

One consequence of the high activity exhibited by these resins is that safeguards must be observed to prevent premature gellation of the resin and loss of wet-strength efficiency. It is known that limiting the solids content of aqueous solutions of such polyamide-epichlorohydrin resins to below about 5 to 10 wt.% and adjusting the pH of the aqueous resin solution to below about 3.0 using a strong mineral acid, such as sulfuric acid, stabilizes the aqueous resin against gellation for relatively long time periods. However, it also is known that as the solids content of the aqueous resin solution increases, its storage stability is degraded significantly.

A variety of procedures are available which purportedly stabilize high solids content aqueous solutions of such resins. Keim U.S. Pat. No. 3,240,761, for example, includes a quaternizing agent such as an alkyl halide during the latter stages of the polyamide-epichlorohydrin reaction. Coscia U.S. Pat. No. 3,259,600 describes adding a stoichiometric excess of certain metal complexing salts to the aqueous resin solution in order to form metal coordination complexes which purportedly enhance resin stability. Earle U.S. Pat. No. 3,352,833 describes using an acidic hydrogen halide such as hydrochloric acid, to stabilize the epichlorohydrin moiety of such aqueous resins without reducing wet strength efficiency by forming the corresponding aminochlorohydrin hydrochloride.

Schmalz U.S. Pat. No. 3,197,427 indicates that the storage stability of certain cationic polyamide-epichlorohydrin resins can be improved by adjusting the pH of the aqueous resin first with formic acid and then with sulfuric acid. The formic acid is added to the aqueous resin in an amount sufficient to adjust its pH into the range of about 3 to 4. Afterward, sulfuric acid is added in an amount sufficient to reduce the pH of the aqueous resin further into the range of about 2 to 3. It is asserted that this procedure provides an aqueous resin system with good stability against gelation and loss of wet-strength efficiency over relatively long periods of time at solids contents of 25% and above.

The prior art has concerned itself primarily with stabilizing such aqueous solutions of polyamide-epichlorohydrin resins against gellation, and has not considered changes in the resin's viscosity which might occur during storage. A common consequence of acid stabilization using a strong mineral acid is an initial degradation of the resin's viscosity due to acid hydrolysis of the polyamide-epichlorohydrin polymer. Even though the viscosity may on some occasions subsequently increase to a desired level due to resin crosslinking, the initial viscosity degradation in the aqueous resin solution has been associated with a loss in the wet-strength efficiency of the resin. For example, although the variation of resin viscosity with time is not reported, data reported in Schmalz, see particularly Examples 10, 11, and 12 (Table 2), indicate that while resin gelation is avoided by the acid treatment, substantial resin hydrolysis does occur during storage as evidenced by the significant viscosity degradation of the stabilized resins.

A procedure which stabilizes high solids content aqueous solutions of such polyamide-epichlorohydrin resins against gellation while at the same time providing stability against a significant loss in solution viscosity therefore would constitute a significant improvement. The present invention has an its objective that result.

It has been discovered that the storage stability of high solids content, aqueous cationic thermosetting polyamide-epichlorohydrin resins useful for imparting wet-strength to paper can be improved by using an aqueous mixture of a weak acid such as formic acid and a strong acid such as sulfuric acid as the acidification agent.

DESCRIPTION OF THE INVENTION

The present invention is directed to a process for stabilizing against gellation and loss in viscosity an aqueous solution containing at least about 15% by weight of a cationic water-soluble thermosetting resin obtained by reacting a polyalkylene polyamine having two primary amine groups and at least one secondary amine group with a dicarboxylic acid or a diester or acid halide thereof to form a long-chain, water-soluble polyamide and then reacting the polyamide with epichlorohydrin to form the water-soluble cationic thermosetting resin. Briefly state, the process comprises adding a mixture of a weak acid, such as formic acid, and a strong acid, such as sulfuric acid to the aqueous solution of the cationic thermosetting resin in an amount sufficient to provide a total acidity of between about 0.6 to 1.2 millimols of titratable protons per gram of resin solids in said aqueous resin solution and to adjust the pH of the aqueous resin solution into the range of from about 3.0 to about 4.2, said mixture having a quantity of weak acid relative to strong acid to provide a mol ratio of total protons available from the weak acid to total protons available from the strong acid within the range of about 0.5 to 10.0.

Cationic thermosetting resins which can be stabilized in accordance with the present invention generally are prepared by reacting a long-chain, water-soluble polyamide with epichlorohydrin. The long-chain, water-soluble polyamide first is prepared by reacting a dicarboxylic acid or a reactive derivative thereof such as a diester or acid halide, with a polyalkylene polyamine, possibly in aqueous solution, under suitable conditions for producing a water-soluble, long-chain polyamide having the below-noted recurring groups.

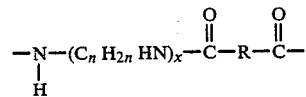

wherein n and x are each 2 or more and R is the divalent organic radical of the dicarboxylic acid or the diester or acid halide thereof. If necessary or desirable, the pH of the resulting aqueous polyamide then may be adjusted within the range from about 8.5 to 9.0, and the polyamide reacted with epichlorohydrin.

Dicarboxylic acids suitable for use in preparing the polyamides used to produce the cationic resins of the present invention include saturated aliphatic dicarboxylic acids, preferably containing from about 3 to 8 carbon atoms such as malonic acid, succinic acid, glutaric acid, adipic acid and the like. Diglycolic acid also can be used as the dicarboxylic acid. Still other dicarboxylic acids will be recognized by those skilled in the art. The dicarboxylic acid is selected so that the resulting long-chain polyamide is preferably water-soluble or at least water-dispersable. For that reason, 4 to 6 carbon atom dicarboxylic acids are preferred. While blends of such dicarboxylic acids can be used, possibly including even longer chain dicarboxlyic acids, the use of adipic acid alone is preferred.

Dicarboxylic diesters suitable for preparing useful polyamides are the lower alkyl diesters produced by reacting the abovenoted $C_3$ to $C_8$ saturated aliphatic dicarboxylic acids with saturated aliphatic monohydric alcohols containing from 1 to 3 carbon atoms, i.e. methanol, ethanol, isopropanol and n-propanol. Methyl and ethyl esters are preferred with the methyl esters being particularly preferred. Exemplary of suitable diesters are dimethyl malonate, diethyl malonate, dimethyl succinate, di-isopropyl succinate, dimethyl glutarate, dimethyl adipate, methyl ethyl adipate. Blends of such esters also can be used. Dimethyl adipate and dimethyl glutarate are preferred.

Suitable polyalkylene polyamines for preparaing the polyamide resin include polyethylene polyamines, polypropylene polyamines, polybutylene polyamines and the like. Typically, suitable polyalkylene polyamines contain two primary amine groups and at least one secondary amine group wherein the nitrogen atoms are linked together by groups of the formula —$C_nH_{2n}$— where n is a small integer greater than unity and the number of such groups in the molecule ranges from 2 up to about 8 and preferably up to about 4. The nitrogen atoms may be attached to adjacent carbon atoms in the group —$C_nH_{2n}$— or to carbon atoms further apart, but should not be attached to the same carbon atom. Specific polyamines suitable for preparing water-soluble polyamides include diethylenetriamine, triethylenetetramine, tetraethylenepentamine, dipropylenetriamine and the like. Still other polyamines will be recognized by those skilled in the art. Based on a variety of considerations diethylenetriamine is preferred.

It is also possible to use mixtures of such polyamines as well as crude polyamine materials. For example, the crude polyethylene polyamines mixture obtained by removing chlorides, water, excess ammonia and any ethylenediamine from the reaction product of ammonia and ethylene dichloride can be used as the starting polyamine material. As recognized by those skilled in the art, the reactivity of the subsequently produced polyamide-epichlorohydrin resin also can be modified by substituting an aliphatic diamine such as ethylenediamine or a heterocyclic diamine such as piperazine for a portion of the polyalkylene polyamine. Normally, replacement of less than about 30% of the polyamine by the diamine is sufficient.

The reaction between the dicarboxylic acid or the diester or acid halide thereof and the polyalkylene polyamine is conducted at a temperature of from about 80° C. up to about 250° C. at atmospheric pressure. Generally, when using a dicarboxylic acid temperatures between about 110° C. and 200° C. are suitable. In such cases, a temperature between about 140° C. and 170° C. generally is preferred. As recognized by those skilled in the art, lower temperatures, e.g. between about 80° and 160° C., may be used when reacting a diester or acid halide of the dicarboxylic acid with the polyamine. The reaction also can be conducted at a subatmospheric pressure in which case a somewhat lower temperature may be used. It is also possible to use a pressurized reactor, although based on considerations of cost and convenience, atmospheric pressure operation is preferred.

The reaction is continued until the polyamide product achieves the desired Gardner-Holdt viscosity, i.e., a Gardner-Holdt viscosity of at least about a D and preferably at least about an E, measured at a refractive index of from about 1.40 to 1.41. As recognized by those skilled in the art, Gardner-Holdt viscosities can be converted to other measures of viscosity. In this case, a suitable kinematic viscosity for the polyamide product would be about 125 to 140 centistokes. Generally, the polyamide resin will exhibit an intrinsic viscosity, measured in 1N aqueous ammonium chloride at 25° C., within the range of about 0.08 to 0.18 dl/l/grams. An intrinsic viscosity in the range of about 0.12 to 0.16 dl/gram is preferred. Although dependent on the reaction temperature and pressure, the time of reaction for preparing a polyamide resin of the desired viscosity may vary between about 0.5 to 15 hours.

Generally, sufficient dicarboxylic acid or the diester or acid halide thereof is supplied to react substantially completely with the primary amine groups on the polyalkylene polyamine, but the amount of acid, diester or acid halide is insufficient to react with any secondary amine groups to any substantial extent. Thus, when using a polyalkylene polyamine having two primary amine groups an appropriate mol ratio of polyalkylene polyamine to dicarboxylic acid (or diester or acid halide) will be between about 0.9:1 to about 1.2:1 and preferably will lie between about 0.92:1 to about 1.14:1. Higher and lower mol ratios may on occasion be used with acceptable results. Normally, the reaction of polyamides prepared at a mol ratio significantly below about 0.9:1 with epichlorohydrin leads to gel products or product having a pronounced tendency to gel while the reaction of polyamides prepared at a mol ratio significantly above 1.2:1 yields products having a low molecular weight. These low molecular weight products typically do not exhibit suffficient wet-strength capacity.

The aqueous polyamide prepared above then is reacted with epichlorohydrin at a temperature from about 45° C. to about 100° C. and preferably from about 45° C. to about 70° C. to form the desired cationic thermosetting resin. Generally, the reaction is allowed to proceed until the viscosity of the aqueous system has reached a desired Gardner-Holdt viscosity. The viscosity of the thermosetting resin should be at least a C and preferably for resins having a 25% solids content is at least D to an E. A Gardner-Holdt viscosity of about a G to an H is most preferred for a resin solution containing 20 to 25% solids. Although dependent on specific reaction conditions, the time required to prepare a resin of the desired viscosity generally will be about 3.0 to 6.0 hours. For resins of higher solids content a higher Gardner-Holdt viscosity would be appropriate. For example, for a 50% solids content resin the Gardner-Holdt viscosity should at least be an M and preferably is at least an X. As used herein resin solids content is synonymous with resin non-volatile content.

If desired, the reaction may be moderated by adding an acid to the reaction solution to reduce its pH either prior to or immediately after the addition of the epichlorohydrin. Any suitable acid including a mineral acid can be used for this purpose as recognized by those skilled in the art. It is preferred to prepare the aqueous polyamide-epichlorohydrin resin solution at a solids content of between about 15 and 30% by weight; and most preferred is a solids content of 20 to 25%. Once the viscosity of the reaction solution has reached the desired point, the product is cooled to about 25° C. and then is stabilized immediately by adding the mixture of the weak acid and strong acid in accordance with the present invention.

Preferably, sufficient epichlorohydrin is used to convert all secondary amine groups of the polyamide to tertiary amine groups and/or quaternary ammonium groups including possibly cyclic structures. Generally, from about 0.5 mols to about 1.8 mols of epichlorohydrin are used per mol of polyamide secondary amine. Preferably, about 1.0 mol to about 1.7 mols of epichlorohydrin are used per mol of polyamide secondary amine. Typically, resin wet strength efficiency is better at the higher epichlorohydrin to polyamide secondary amine mol ratios. If the ratio is too high however severe stability problems are encountered.

In accordance with the present invention, the cationic water-soluble polyamide-epichlorohydrin resins prepared as described above are stabilized by adding a mixture of a weak acid, such as formic acid, and a strong acid such as sulfuric acid to the resin. The aqueous mixture of the weak and strong acids can be prepared by first adding the necessary amount of a weak acid to ballast water and then slowly adding the desired amount of the strong acid to the aqueous weak acid solution. Suitable weak acids include formic acid, acetic acid, benzoic acid, propionic acid and the like; while strong acids include hydrochloric acid, nitric acid, sulfuric acid, perchloric acid and the like.

In terms of the present invention, suitable weak acid-strong acid pairs are characterized by the strong acid having an ionization or acid dissociation constant at least about four orders of magnitude greater than, i.e. $10^4$ times greater than, the acid dissociation constant of the weak acid. The combination of formic acid and sulfuric acid is preferred. Another suitable combination is acetic and hydrochloric acid.

It is important that sufficient mixed acid be added to the cationic water-soluble polyamide-epichlorohydrin resin solution so as to obtain a total acidity, measured as the resin solution's titratable proton content, of between about 0.6 to 1.2 millimol of titratable protons per gram of resin solids in the resin solution. The titratable proton content or titratable proton concentration of the aqueous resin solution conveniently is measured using a titrimeter, such as the Brinkman Model 636, Titroprocessor, and employing a strong base such as 1N sodium hydroxide. The titration is run past the second inflection point. Preferably sufficient mixed acid is used to obtain a total acidity of between about 0.7 and 1.0 millimol of titratable protons per gram of resin solids. Generally, the pH of the aqueous resin will be reduced to between about 3.0 and 4.2, preferably between about 3.2 and 3.8 most preferably between about 3.2 and 3.4 by the addition of the mixed acid.

By using the simultaneous addition of the weak and strong acids via the aqueous acid mixture, resin stability is obtained at a higher pH than required by the sequential addition procedure of the prior art, i.e., Schmalz U.S. Pat. No. 3,197,427. At this higher pH condition, less acid hydrolysis of the polyamide-epichlorohydrin resin occurs. Thus, the stabilized resin solution is less likely to experience viscosity instabilities and loss of wet strength efficiency.

For proper stabilization, it is important to maintain the mol ratio of the total protons available from the weak acid to the protons available from the strong acid within the range of about 0.5 to 10.0, preferably within the range of about 2.0 to 4.0 and most preferably about 3.0 to 3.1. As used herein, the phrase 'total protons' means the quantity of protons available respectively from the weak and strong acids assuming total or complete ionization or dissociation of the acids. In the case of a mixed acid prepared using formic acid and sulfuric acid it is preferred to maintain the relative amount of formic acid and sulfuric acid in the mixed acid between about 2 parts by weight of formic acid per part by weight of sulfuric acid up to about 4 parts by weight of formic acid per part by weight of sulfuric acid. Preferably, about 2.9 to 3.0 parts by weight of formic acid per part by weight of sulfuric acid are included in the mixed acid.

Another important feature of the present invention is that by using a single acidifying reagent containing a mixture of both the weak acid and the strong acid it is possible to control precisely the relative amount of weak acid and strong acid added to the polyamide-epichlorohydrin resin. In the prior art procedure, as exemplified by Schmalz, wherein formic acid was added to the resin to lower the pH to about 3.0 to about 4.0 and then sulfuric acid was added to reduce the pH to about 2.0 to about 3.0, there was no way in the commercial context to insure that the relative amount of formic acid to sulfuric acid was maintained constant from batch to batch. This problem with reproducibility is thought to be responsible, in part, for viscosity instabilities exhibited by prior art resins stabilized using sequential addition of formic acid and sulfuric acid.

Stabilized polyamide-epichlorohydrin resins of the present invention may be incorporated into the paper pulp slurry at any point on the wet end of the paper machine. Such resins also may be applied from a tub size or at a size press or from showers onto the dried or partially dried paper sheet. For most purposes, adequate wet-strength may be obtained by incorporating in the paper from about 0.2 to about 1.0% of the resin based on the dry weight of the pulp, preferably about 0.6 to 0.8%. However, in some circumstances it may be useful to use up to about 1.2% or more.

The following examples are provided to assist in the understanding of the invention and are not intended to be limitations on the scope of the disclosure. All reported percentages and parts are of solid are on a weight basis, unless otherwise specifically indicated.

EXAMPLE 1

Two hundred and eighteen parts of diethylenetriamine were placed in a reaction vessel and agitated. To this were added 300 parts of adipic acid. Once the acid had dissolved in the amine, the contents of the reactor were heated to a temperature in the range of 145° to 160° C. and held there until the reaction was completed, as evidenced by the reaction product exhibiting a Gardner-Holdt viscosity of about an E to an F measured at a refractive index of from about 1.404 to about 1.407, respectively. Then 435 parts of water slowly were added to the polyamide and the polyamide solution was cooled to about 45° C. The resulting polyamide solution contained about 48% solids by weight.

chlorohydrin solution, up to about 1.4 millimols of titratable protons per gram of resin solids. These total acidity values were calculated based on the amount of sulfuric acid added to the resin solution. Over the lower portion of the acidity range, i.e., at an acidity of less than 0.76, millimol of titratable protons, the polyamide-epichlorohydrin resins were prone to gellation in less than about 30 days, while substantially all of the remaining resins experienced a significant degradation in viscosity within the first two weeks of storage. Table 1 reports the results of selected solutions.

TABLE 1

| Example No. | Total Acidity | pH | Minimum Gardner-Holdt Viscosity | | | | |
|---|---|---|---|---|---|---|---|
| | | | Days 1-5 | Days 6-10 | Days 11-15 | Days 16-20 | Days 21-30 |
| 3 | 0.61 | 1.85 | $GH^2$ | GELLED | — | — | — |
| 4 | 0.76 | 2.38 | E | $E^2F$ | I | UV | GELLED |
| 5 | 0.79 | 2.1 | D | * | $D^2E$ | DE | E |
| 6 | 0.8 | 1.8 | D | CD | * | * | DE |
| 7 | 0.85 | 1.65 | C | BC | C | * | CD |
| 8 | 0.91 | 1.82 | D | B | BC | * | C |
| 9 | 0.97 | 1.72 | $BC^2$ | $AB^2$ | * | * | B |
| 10 | 1.0 | 1.35 | $AB^2$ | $A^2B$ | A | $A^2B$ | * |
| 11 | 1.2 | 1.35 | $A^2B$ | $A_1$ | * | * | * |
| 12 | 1.4 | 1.2 | $A^2A_1$ | $A_1A_2$ | * | * | $A_1A_2$ |

*Viscosity not measured for this time period.

EXAMPLE 2

To 100 parts of the polyamide solution of Example 1 were added about 220 parts of water. The temperature of this solution was adjusted to 35° C. and 33 parts of epichlorohydrin were added with vigorous agitation. The mixture then was heated to about 65° C. and was maintained between 60 and 70° C. until it had obtained a viscosity of EF (Gardner-Holdt scale). Then 22 parts water and 7.4 parts of an acid mixture containing formic acid and sulfuric acid in a mol ratio of 6.4:1 and having an acid concentration of 47% by weight, were added to the resin product and it was cooled to 25° C. Since sulfuric acid is diprotic, this corresponds to an equivalent ratio (total proton mol ratio) of formic acid to sulfuric acid of 3.2:1. The resulting product had a titratable proton content of about 0.9 millimol per gram of resin solids, contained about 20% solids and had a Gardner-Holdt viscosity of about a D-E.

EXAMPLES 3-12

In these examples, the procedure of Example 2 was repeated to prepare a series of resins having a solids content of about 20%, except that only sulfuric acid, rather than the mixed acid, was added to the polyamide-epichlorohydrin resin to adjust its acidity at the time the resin was cooled. The quantity of sulfuric acid was varied from a low of about 0.61 milimol of titratable protons per grams of resin solids in the polyamide-epi-

EXAMPLES 13-20

In these examples, the procedure of Example 2 again was repeated to prepare a series of polyamide-epichlorohydrin resins having a 20% solids content using mixed acids having the same formic acid to sulfuric acid mol ratio of about 6:3, i.e., a formic acid to sulfuric acid equivalent ratio or mol ratio of total available protons of about 3:1 and a variety of levels of total acidity, measured using a Brinkman Model 636 Titroprocessor, 50 grams of resin in 100 ml of water, and 1N sodium hydroxide and titrated past the second inflection point. As above, the mixed acid was used to adjust the acidity of the aqueous resin solution at the time the resin was being cooled. The results are presented in Table 2. None of the test solutions gelled, nor did any experience significant early or initial hydrolysis.

EXAMPLES 21-26

In these examples, a series of polyamide-epichlorohydrin resins having a solids content of 20 weight percent were prepared using the procedure of Example 2 and mixed acids containing formic acid and sulfuric acid at several formic acid to sulfuric acid mol ratios. Each mixed acid solution tested was used to adjust the acidity of the aqueous resin solution at the time the resin was being cooled. The results are presented in Table 3.

TABLE 2

| Example No. | Total Acidity[1] | pH | Minimum Gardner-Holdt Viscosity | | | | |
|---|---|---|---|---|---|---|---|
| | | | Days 1-5 | Days 6-10 | Days 11-15 | Days 16-20 | Days 21-30 |
| 13 | 0.66 | 3.55 | F | H | I | * | $H^2I$ |
| 14 | 0.88 | 3.28 | D | $D^2E$ | $D^2E$ | D | * |
| 15 | 0.88 | 3.30 | E | * | E | * | DE |
| 16 | 0.92 | 3.20 | E | DE | $D^2E$ | * | D |
| 19 | 0.94 | 3.25 | DE | DE | * | D | CD |
| 18 | 0.98 | 3.30 | $CD^2$ | CD | * | $C^2D$ | $BC^2$ |
| 19 | 1.1 | 3.1 | DE | $D^2E$ | D | * | C |
| 20 | 1.2 | 3.0 | D | C | $BC^2$ | BC | $B^2C$ |

*Viscosity not measured for time period.
[1]measured using a titrimeter

TABLE 3

| Example No. | Equivalent Ratio | Total Acidity[1] | pH | Days 1-5 | Days 6-10 | Days 11-15 | Days 16-20 | Days 21-30 |
|---|---|---|---|---|---|---|---|---|
| | | | | \multicolumn{5}{|c|}{Minimum Gardner-Holdt Viscosity} |
| 21 | 1.1 | 0.61 | 3.6 | $F^2G$ | HI | JK | L | $L^2M$ |
| 22 | 3.2 | 0.86 | 3.8 | DE | D | $C^2D$ | $B^2C$ | BC |
| 23 | 0.48 | 1.1 | 1.9 | D | $C^2D$ | $BC^2$ | BC | BC |
| 24 | 1.1 | 1.1 | 2.1 | DE | BC | $B^2C$ | B | B |
| 25 | 3.3 | 1.9 | 2.4 | $CD^2$ | BC | * | B | AB |
| 26 | 9.9 | 2.4 | 2.5 | D | BC | B | $AB^2$ | AB |

*Viscosity not measured for this time period.
[1]measured using a titrimeter

EXAMPLES 27–33

A series of polyamide-epichlorohydrin resins were prepared using the procedure of Example 2, except that the amount of water added to the resin was limited so that the product resin solution contained about 25% solids by weight. As above, a number of mixed acid solutions containing formic acid and sulfuric acid at an equivalent ratio of about 3.0 (See Col. 2 of Table 4), were added to each resin solution to adjust the acidity at the same time the resin was being cooled. Results are presented in Table 4.

A comparison of Tables 2 through 4 illustrates that at the higher levels of acidity, i.e. at titratable proton contents of above 1.2, and/or at the lower weak acid to strong acid equivalent ratios, i.e. at ratios below about 1.0 (more strong acid than weak acid), resin hydrolysis may occur during prolonged storage. For this reason, it is preferred to stabilize the aqueous resin soluton at a total acidity of between about 0.7 and 1.0 millimol of titratable protons per gram of resin solids using a mixed acid having an equivalent ratio above about 1.0 and preferably between about 2.0 and 4.0.

TABLE 4

| Example No. | Equivalent Ratio | Total Acidity[1] | pH | Days 1-10 | Days 11-20 | Days 21-30 | Days 31-40 | Days 41-50 |
|---|---|---|---|---|---|---|---|---|
| | | | | \multicolumn{5}{|c|}{Minimum Gardner-Holdt Viscosity} |
| 27 | 3.0 | 0.65 | 3.8 | E | IJ | I | GH | $EF^2$ |
| 28 | 3.0 | 0.73 | 3.5 | DE | $E^2D$ | EF | E | $DE^2$ |
| 29 | 3.2 | 0.78 | 3.8 | E | GH | JK | $J^2K$ | HI |
| 30 | 3.0 | 0.81 | 3.6 | $D^2E$ | EF | E | * | $D^2E$ |
| 31 | 3.0 | 0.81 | 3.4 | DE | FG | $EF^2$ | EF | $E^2F$ |
| 32 | 3.0 | 0.97 | 3.3 | $D^2E$ | $D^2E$ | $C^2D$ | C | BC |
| 33 | 3.0 | 1.0 | 3.8 | DE | E | DE | * | D |

*Viscosity not measured for this time period.
[1]measured using a titrimeter

EXAMPLE 34

In this example a commercial sized batch of a polyamide-epichlorohydrin resin was prepared using the procedure of Example 2, except that the amount of water added to the resin was limited so that the product resin solution contained about 25% solids by weight. A mixed acid solution containing formic acid and sulfuric acid at an equivalent ratio of about 3.1:1 was added to the resin solution to adjust its acidity to about 0.9 millimol of titratable protons per gram of resin solids at the time the resin was being cooled. Table 5 below shows the resin's viscosity as a function of time at temperatures of 25° and 35° C. The resin showed excellent stability by avoiding both gellation and any significant loss in viscosity.

TABLE 5

| DAYS, AGE | VISCOSITY | |
|---|---|---|
| | 25° C. | 35° C. |
| 0 | EF | EF |
| 7 | EF | EF |
| 14 | F | $H^2I$ |
| 21 | G | J |
| 28 | GH | JK |
| 35 | * | $J^2K$ |
| 42 | * | J |
| 49 | * | HI |
| 54 | I | $G^2H$ |
| 77 | $J^2K$ | EF |
| 100 | * | $DE^2$ |

*Viscosity not measured.

Although certain embodiment of the invention have been described in detail, it will be appreciated that other embodiments are contemplated along with modifications of the disclosed features, as being within the scope of the invention, which is defined in the appended claims.

I claim:

1. A process of stabilizing, against gellation and viscosity loss due to hydrolysis, an aqueous solution containing at least about 15% by weight of a water-soluble cationic polyamide-epichlorohydrin thermosetting wet strength resin which comprises, adding to said aqueous solution an aqueous mixture of a weak acid and a strong acid in an amount sufficient to provide a total acidity of between about 0.6 and 1.2 millimols of titratable protons per gram of resin solids, the mol ratio of total protons available from the weak acid to total protons available from the strong acid being within the range of about 0.5 to 10.0.

2. The process of claim 1 wherein the mol ratio of total protons available from the weak acid to total protons available from the strong acid is within the range of 2.0 to 4.0.

3. The process of claim 2 wherein the aqueous mixture is added to provide a total acidity of between about 0.7 to 1.0 millimol of titratable protons per gram of resin solids.

4. The process of claim 3 wherein the aqueous solution has a pH of between about 3.0 and 4.2 after said aqueous mixture has been added.

5. The process of claim 4 wherein said pH is between about 3.2 and 3.4.

6. The process of claim 1 wherein said aqueous solution contains between about 15 and 30% by weight of said wet strength resin.

7. The process of claim 3 wherein said aqueous solution contains between about 20 and 25% by weight of said wet strength resin.

8. The process of claim 1 wherein said weak acid is selected from the group consisting of formic acid, acetic acid, benzoic acid and propionic and said strong acid is selected from the group consisting of hydrochloric acid, nitric acid, sulfuric acid and perchloric acid.

9. The process of claim 3 wherein said weak acid is formic acid and said strong acid is sulfuric acid.

10. The process of claim 1 wherein said wet strength resin is prepared by reacting epichlorohydrin with a polyamide, said polyamide having been prepared by reacting a polyalkylene polyamine containing two primary amine groups and at least one secondary amine group with a saturated aliphatic dicarboxylic acid containing from 3 to 8 carbon atoms, or a lower alkyl diester or acid halide thereof, at a mol ratio of polyamine to the dicarboxylic acid or to the lower alkyl diester or acid halide thereof between about 0.9:1 to about 1.2:1.

11. The process of claim 3 wherein said wet strength resin is prepared by reacting epichlorohydrin with a polyamide, said polyamide having been prepared by reacting a polyalkylene polyamine containing two primary amine groups and at least one secondary amine group with a saturated aliphatic dicarboxylic acid containing from 3 to 8 carbon atoms, or a lower alkyl diester or acid halide thereof, at a mol ratio of polyamine to the dicarboxylic acid or to the lower alkyl diester or acid halide thereof between about 0.9:1 to about 1.2:1.

12. The process of claim 10 wherein from about 1.0 to 1.7 mols of epichlorohydrin was used per mol of polyamide secondary amine.

13. The process of claim 11 wherein from about 1.0 to 1.7 mols of epichlorohydrin are used per mol of polyamide secondary amine.

14. The process of claim 13 wherein the polyamine is diethylenetriamine and the dicarboxylic acid is adipic acid.

15. The process of claim 13 wherein the polyamine is diethylenetriamine and the lower alkyl diester is dimethyl glutarate.

16. The process of claim 13 wherein the polyamine is diethylenetriamine and the lower alkyl diester is dimethyl adipate.

* * * * *

UNITED STATES PATENT AND TRADEMARK OFFICE
CERTIFICATE OF CORRECTION

PATENT NO. : 4,853,431
DATED : August 1, 1989
INVENTOR(S) : John F. Miller

It is certified that error appears in the above-identified patent and that said Letters Patent is hereby corrected as shown below:

IN THE CLAIMS

In claim 8, line 3, (Col. 11, line 15), after "propionic", please insert -- acid --.

Signed and Sealed this

Tenth Day of July, 1990

Attest:

HARRY F. MANBECK, JR.

*Attesting Officer*     *Commissioner of Patents and Trademarks*